United States Patent
Andoh (10) Patent No.: US 9,399,405 B2
(45) Date of Patent: Jul. 26, 2016

(54) INVERTED VEHICLE CONTROL APPARATUS, AND METHOD AND PROGRAM THEREFOR

(75) Inventor: Fukashi Andoh, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/233,914

(22) PCT Filed: Jul. 22, 2011

(86) PCT No.: PCT/JP2011/004141
§ 371 (c)(1),
(2), (4) Date: Jan. 21, 2014

(87) PCT Pub. No.: WO2013/014696
PCT Pub. Date: Jan. 31, 2013

(65) Prior Publication Data
US 2014/0172262 A1 Jun. 19, 2014

(51) Int. Cl.
*B60T 7/12* (2006.01)
*G05D 1/00* (2006.01)
*B60L 15/20* (2006.01)
*B62K 3/00* (2006.01)

(52) U.S. Cl.
CPC ............... *B60L 15/20* (2013.01); *B62K 3/007* (2013.01); *Y02T 10/7258* (2013.01)

(58) Field of Classification Search
CPC ...... B62K 3/007; B60L 15/20; Y02T 10/7258
USPC ................................. 701/41, 71, 82
See application file for complete search history.

(56) References Cited

U.S. PATENT DOCUMENTS

| | | | |
|---|---|---|---|
| 6,408,240 B1 * | 6/2002 | Morrell | B62K 3/007 180/197 |
| 2004/0007399 A1 * | 1/2004 | Heinzmann | A63C 17/12 180/7.1 |
| 2005/0121238 A1 * | 6/2005 | Ishii | A63C 17/08 180/65.1 |
| 2010/0017090 A1 | 1/2010 | Doi | |
| 2010/0023220 A1 * | 1/2010 | Nakashima | G05D 1/0272 701/42 |
| 2010/0030441 A1 * | 2/2010 | Kosaka | 701/70 |
| 2010/0114421 A1 | 5/2010 | Doi | |

FOREIGN PATENT DOCUMENTS

| | | |
|---|---|---|
| CN | 101600618 A | 12/2009 |
| EP | 2128011 A1 | 12/2009 |
| JP | 2004-510637 A | 4/2004 |
| JP | 2008-189089 A | 8/2008 |
| JP | 4162995 B2 | 10/2008 |
| WO | 02/30730 A2 | 4/2002 |

* cited by examiner

*Primary Examiner* — Tuan C. To
*Assistant Examiner* — Isaac Smith
(74) *Attorney, Agent, or Firm* — Kenyon & Kenyon LLP (57) ABSTRACT

An inverted vehicle control apparatus includes a plurality of driving wheels, a plurality of drive means each of which drives a respective one of the plurality of driving wheels, skid detection means for detecting a skid state between the driving wheels and a road surface, operation information acquisition means for acquiring operation information of a rider, and control means for controlling the drive means to control the driving wheels. The control means controls, based on the operation information acquired by the operation information acquisition means, the driving wheel for which no skid is detected by the skid detection means, and the control means controls the driving wheel for which a skid is detected by the skid detection means so that a friction reaction force exerted from the road surface to the driving wheel is exerted in such a direction that the inverted vehicle is raised by the friction reaction force.

9 Claims, 4 Drawing Sheets

INVERTED VEHICLE CONTROL APPARATUS, AND METHOD AND PROGRAM THEREFOR

CROSS-REFERENCE TO RELATED APPLICATIONS

This is a national phase application based on the PCT International Patent Application No. PCT/JP2011/004141 filed on Jul. 22, 2011, the entire contents of which are incorporated herein by reference.

TECHNICAL FIELD

The present invention relates to an inverted vehicle control apparatus that controls an inverted vehicle, and a method and a program therefor.

BACKGROUND ART

An inverted vehicle, on which a rider rides and which performs desired traveling while maintaining the inverted state, has been known. In such an inverted vehicle, a safety issue that arises, for example, when the inverted vehicle travels on a low-friction road surface such as a puddle, poses a problem.

To cope with this, an inverted vehicle control apparatus that, when it is determined that a driving wheel(s) has started to skid on the road surface, reduces the driving torque provided to each drive wheel until the skid of the skidding drive wheel stops has been known (see Patent literature 1).

CITATION LIST

Patent Literature

Patent literature 1: Japanese Patent No. 4162995

SUMMARY OF INVENTION

Technical Problem

However, in the above-described inverted vehicle control apparatus disclosed in Patent literature 1, the inverted vehicle control apparatus simply reduces the torque of the driving wheel(s). Therefore, if the amount of the skid of the driving wheel(s) is large during the traveling on the low-friction road surface, the inverted vehicle control apparatus cannot maintain the traveling safely or stop the inverted vehicle safely.

The present invention has been made to solve the above problem, and a principal object thereof is to provide an inverted vehicle control apparatus, and its control method and program, capable of making an inverted vehicle travel safely or stop safely even on a low-friction road surface.

Solution to Problem

To achieve the above-described object, one aspect of the present invention is an inverted vehicle control apparatus including: a plurality of driving wheels provided in an inverted vehicle; a plurality of drive means each of which drives a respective one of the plurality of driving wheels; skid detection means for detecting a skid state between the plurality of driving wheels and a road surface; operation information acquisition means for acquiring operation information of a rider; and control means for controlling driving of the drive means and thereby controlling the plurality of driving wheels, in which the control means controls, based on the operation information acquired by the operation information acquisition means, the driving wheel for which no skid is detected by the skid detection means, and the control means controls the driving wheel for which a skid is detected by the skid detection means so that a friction reaction force exerted from the road surface to the driving wheel is exerted in such a direction that the inverted vehicle is raised by the friction reaction force. According to this one aspect, it is possible to make the inverted vehicle travel safely or stop safely even on a low-friction road surface.

In this one aspect, the inverted vehicle control apparatus may further include: pitch angle detection means for detecting a pitch angle of the inverted vehicle; and wheel horizontal speed calculation means for calculating a horizontal speed of the driving wheel of the inverted vehicle, in which the control means may control the driving wheel for which the skid is detected by the skid detection means, based on the pitch angle of the inverted vehicle detected by the pitch angle detection means and the horizontal speed of the driving wheel calculated by the wheel horizontal speed calculation means.

In this one aspect, the control means may include: wheel angular speed reference input calculation means for calculating an angular speed reference input of the driving wheel based on operation information acquired by the operation information acquisition means, a horizontal moving speed of the driving wheel calculated by the wheel horizontal speed calculation means, and skid information of the driving wheel detected by the skid detection means; and safety control means for maintaining an inverted state of the inverted vehicle by controlling the driving of the drive means based on the angular speed reference input of the driving wheel calculated by the wheel angular speed reference input calculation means.

In this one aspect, the wheel angular speed reference input calculation means may calculate the angular speed reference input for the driving wheel for which the skid is detected by the skid detection means, by using an expression shown below.

In this one aspect, the operation information acquisition means may include traveling direction speed input means for outputting a traveling direction and a traveling speed of the inverted vehicle based on the operation information entered by the rider.

In this one aspect, the inverted vehicle control apparatus may further include: wheel angular speed detection means for detecting an angular speed of the driving wheel; yaw angle detection means for detecting a yaw angle of the inverted vehicle; and wheel horizontal acceleration calculation means for calculating a horizontal acceleration of the driving wheel based on the angular speed of the driving wheel detected by the wheel angular speed detection means, the pitch angle of the inverted vehicle detected by the pitch angle detection means, the yaw angle of the inverted vehicle detected by the yaw angle detection means, and a control signal for controlling the drive means.

In this one aspect, the skid detection means may include skid parameter calculation means for calculating a skid parameter indicating whether the driving wheel is skidding or not, based on the angular speed of the driving wheel detected by the wheel angular speed detection means and the horizontal acceleration of the driving wheel calculated by the wheel horizontal acceleration calculation means, and outputting the calculated skid parameter to the control means.

In this one aspect, the wheel horizontal acceleration calculation means may calculate a horizontal acceleration of the first and second driving wheels by using an expression shown below.

In this one aspect, the safety control means may calculate a driving torque T for the skidding driving wheel by using an expression shown below.

Further, to achieve the above-described object, another aspect of the present invention may be a control method for an inverted vehicle control apparatus, including: a step of detecting a skid state between a plurality of driving wheels provided in an inverted vehicle and a road surface; a step of acquiring operation information of a rider; and a step of controlling, based on the acquired operation information, the driving wheel for which no skid is detected, and controlling the driving wheel for which a skid is detected so that a friction reaction force exerted from the road surface to the driving wheel is exerted in such a direction that the inverted vehicle is raised by the friction reaction force.

Further, to achieve the above-described object, another aspect of the present invention may be a program for an inverted vehicle control apparatus for causing a computer to execute: a process of detecting a skid state between a plurality of driving wheels provided in an inverted vehicle and a road surface; and a process of controlling, based on operation information of a rider, the driving wheel for which no skid is detected, and controlling the driving wheel for which a skid is detected so that a friction reaction force exerted from the road surface to the driving wheel is exerted in such a direction that the inverted vehicle is raised by the friction reaction force.

Advantageous Effects of Invention

According to the present invention, it is possible to provide an inverted vehicle control apparatus, and its control method and program, capable of making an inverted vehicle travel safely or stop safely even on a low-friction road surface.

DESCRIPTION OF EMBODIMENTS

Figure 4:
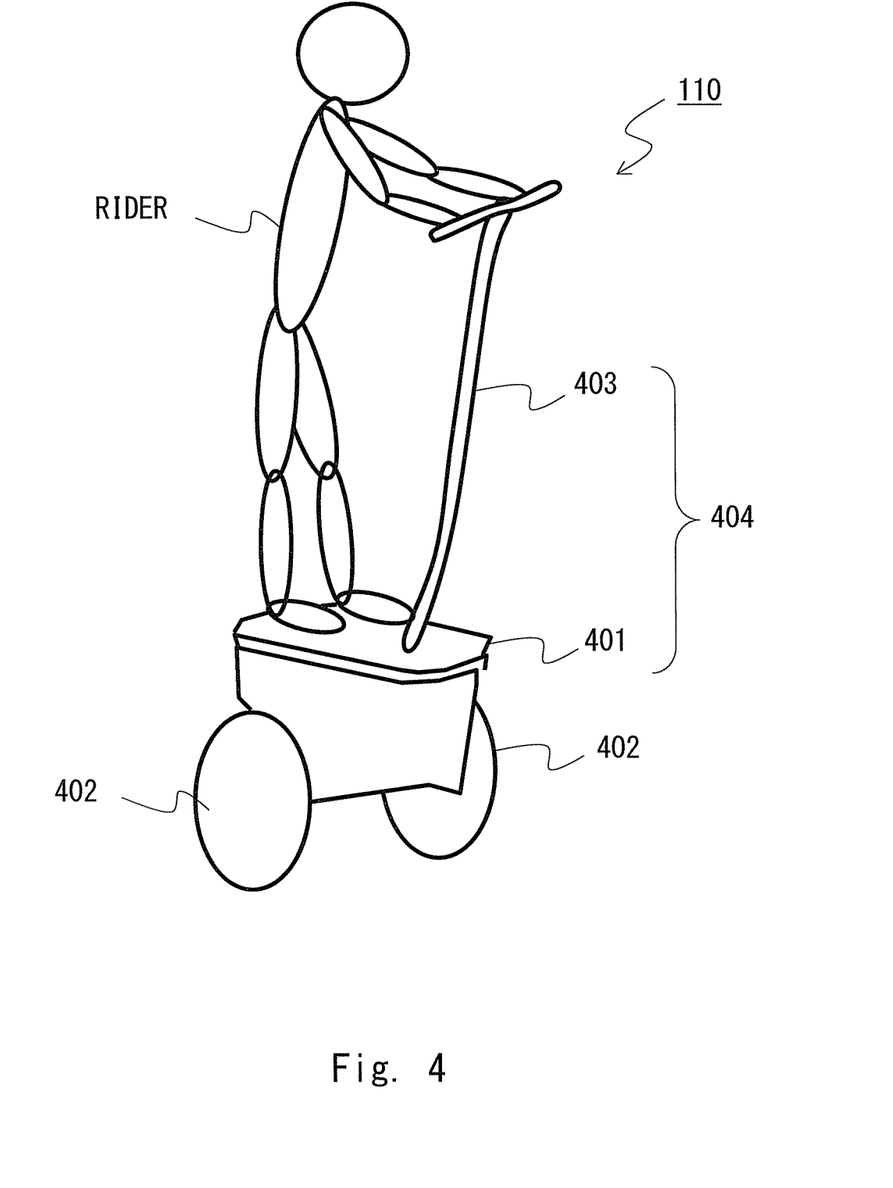
FIG. 4 is a perspective view showing a schematic configuration of an inverted vehicle control apparatus according to an exemplary embodiment of the present invention.

Exemplary embodiments according to the present invention are explained hereinafter with reference to the drawings. An inverted vehicle control apparatus 100 according to an exemplary embodiment of the present invention is an apparatus that controls the traveling of an inverted vehicle 110 as shown in FIG. 4. The inverted vehicle 110 according to this exemplary embodiment includes a platform 401 on which a rider rides, a pair of first and second driving wheels 402 rotatably disposed on both sides of the platform 401, a handlebar 403 which is swingably disposed in the platform 401 and which the rider grasps and operates, and a control mechanism 111 disposed inside the platform 401. The inverted vehicle 110 performs desired traveling while maintaining the inverted state according to a traveling operation by the rider.

Figure 1:
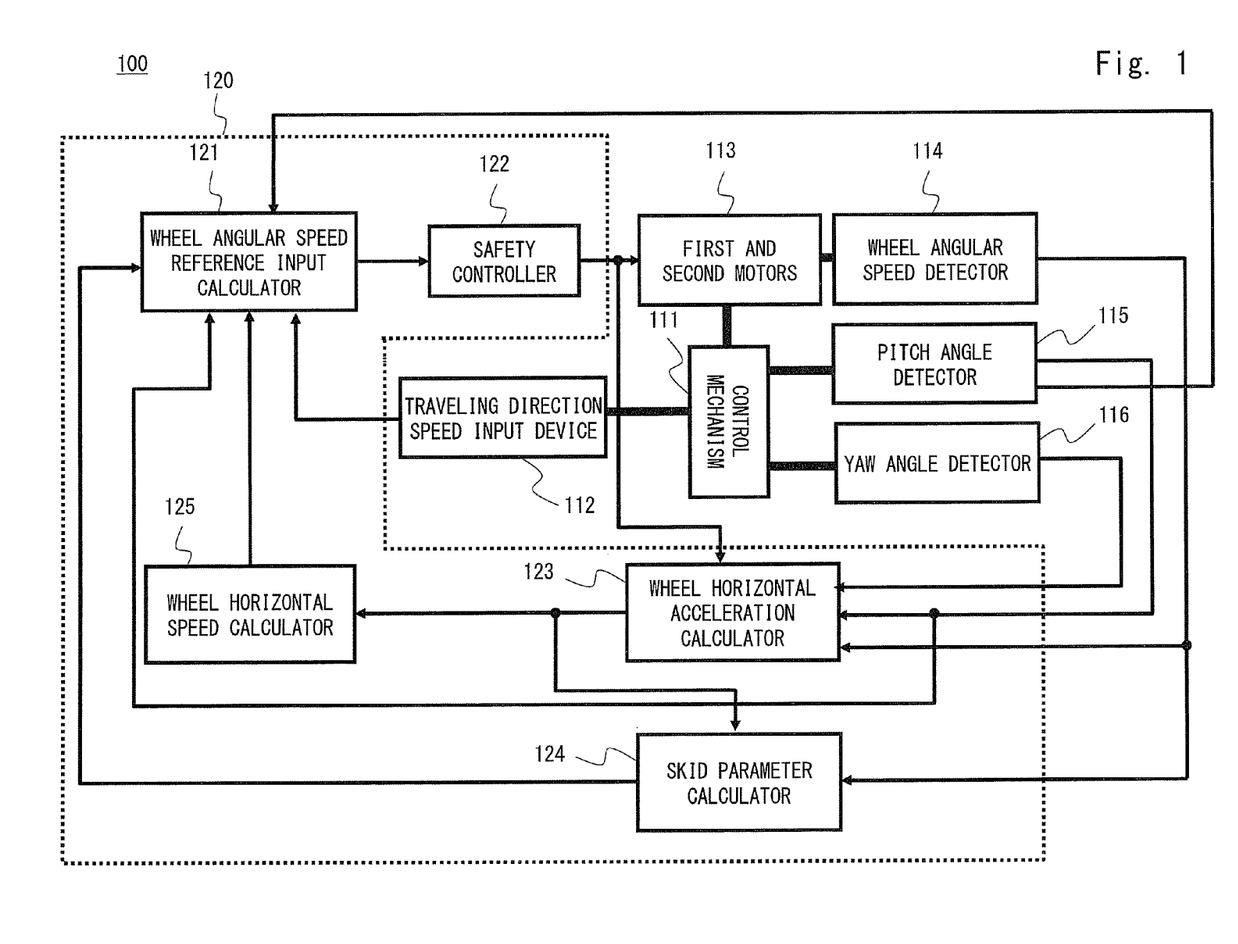
FIG. 1 is a block diagram showing a schematic system configuration of an inverted vehicle control apparatus according to an exemplary embodiment of the present invention.

FIG. 1 is a block diagram showing a schematic system configuration of an inverted vehicle control apparatus according to this exemplary embodiment. The inverted vehicle control apparatus 100 according to this exemplary embodiment includes the control mechanism 111, a traveling direction speed input device 112 that detects the operation state of the handlebar 403 by the rider, a pair of first and second motors 113 that drive the first and second driving wheels 402, a wheel angular speed detector 114 that detects angular speeds of the first and second driving wheels 402, a pitch angle detector 115 that detects the pitch angle of the platform 401, a yaw angle detector 116 that detects the yaw angle of the platform 401, and a control device 120 that controls the driving of each of the first and second motors 113.

The traveling direction speed input device 112 is a specific example of the traveling direction speed input means and is disposed in the handlebar 403. When the rider operates the handlebar 403 by tilting the handlebar 403 in a desired direction, the traveling direction speed input device 112 detects the tilt angle of that handlebar 403, calculates the traveling direction and the moving speed of the inverted vehicle 110 according to that tilt angle, and outputs the calculated direction and speed to the control device 120 as traveling direction speed information.

The first and second motors 113 are a specific example of the drive means, and are disposed inside the platform 401 and connected to the drive shaft(s) of the first and second driving wheels 402 through a speed reducer or the like. The first and second motors 113 rotationally drive the first and second driving wheels 402 independently of each other according to a control signal(s) from the control device 120, and thereby make the inverted vehicle 110 travel in a desired direction at a desired speed while maintaining the inverted state of the inverted vehicle 110.

The wheel angular speed detector 114 is a specific example of the wheel angular speed detection means and is disposed in the drive shaft of the first and second driving wheels 402 or the like. The wheel angular speed detector 114 detects the angular speeds of the first and second driving wheels 402 and outputs the detected angular speeds to the control device 120 as measured wheel angular speeds.

The pitch angle detector 115 is a specific example of the pitch angle detection means and is disposed in the platform 401. The pitch angle detector 115 detects the pitch angle of the platform 401 and outputs the detected pitch angle to the control device 120 as a measured pitch angle.

The yaw angle detector 116 is a specific example of the yaw angle detection means and is disposed in the platform 401. The yaw angle detector 116 detects the yaw angle of the platform 401 and outputs the detected yaw angle to the control device 120 as a measured yaw angle.

The control device 120 includes a wheel angular speed reference input calculator 121, a safety controller 122, a wheel horizontal acceleration calculator 123, a skid parameter calculator 124, and a wheel horizontal speed calculator 125.

Note that the control device 120 is composed of, for example, hardware including a microcomputer as a principal component. The microcomputer includes, for example, a CPU (Central Processing Unit) that performs arithmetic processing, control processing, and the like, a ROM (Read Only Memory) that stores an arithmetic program, a control processing program, and the like that are executed by the CPU, and a RAM (Random Access Memory) that temporarily stores processing data and the like. Further, the CPU, the ROM, and the RAM are connected with one another through a data bus or the like.

The wheel horizontal acceleration calculator 123 is a specific example of the wheel horizontal acceleration calculation means. The wheel horizontal acceleration calculator 123 calculates a wheel horizontal acceleration(s) indicating the horizontal acceleration(s) of the first and second driving wheels 402 based on the measured wheel angular speed from the wheel angular speed detector 114, the measured pitch angle from the pitch angle detector 115, measured yaw angle from the yaw angle detector 116, and a motor current(s) (control signal(s)) output from the safety controller 122 to the first and second motors 113, and outputs the calculated wheel horizontal acceleration(s) to the skid parameter calculator 124 and the wheel horizontal speed calculator 125.

The skid parameter calculator 124 is a specific example of the skid parameter calculation means. The skid parameter calculator 124 calculates first and second skid parameters indicating the skid states of the first and second driving wheels 402 based on the wheel horizontal acceleration from the wheel horizontal acceleration calculator 123 and the measured wheel angular speed from the wheel angular speed detector 114, and outputs the calculated first and second skid parameters to the wheel angular speed reference input calculator 121.

The wheel horizontal speed calculator 125 is a specific example of the wheel horizontal speed calculation means. The wheel horizontal speed calculator 125 performs integration processing for the wheel horizontal acceleration from the wheel horizontal acceleration calculator 123, calculates wheel horizontal speeds indicating the horizontal speeds of the first and second driving wheels 402, and outputs the calculated wheel horizontal speeds to the wheel angular speed reference input calculator 121.

The wheel angular speed reference input calculator 121 is a specific example of the wheel angular speed reference input calculation means. The wheel angular speed reference input calculator 121 calculates first and second wheel angular speed reference inputs for the first and second driving wheels 402 for making the inverted vehicle 110 travel safely or stop safely, based on the traveling direction speed information from the traveling direction speed input device 112, the wheel horizontal speed from the wheel horizontal speed calculator 125, the first and second skid parameters from the skid parameter calculator 124, and the measured pitch angle from the pitch angle detector 115, and outputs the calculated first and second wheel angular speed reference inputs to the safety controller 122.

The safety controller 122 is a specific example of the safety control means. The safety controller 122 calculates such motor currents that the safest motor torques are generated according to the skid states between the first and second driving wheels 402 and the road surface, based on the first and second wheel angular speed reference inputs from the wheel angular speed reference input calculator 121, and outputs the calculated motor currents to the first and second motors 113.

More specifically, the safety controller 122 controls, based on operation information entered by the rider, the first or second driving wheel 402 for which no skid is detected, and controls the first or second driving wheel 402 for which a skid is detected so that the friction reaction force exerted from the road surface to the first or second driving wheel 402 is exerted in such a direction that the inverted vehicle 110 is raised by the friction reaction force. In this manner, by appropriately controlling not only the non-skidding driving wheel 402 but also the skidding driving wheel 402, the inverted state of the inverted vehicle 110 can be maintained as much as possible. Further, even if the inverted state cannot be maintained, the falling-down impact can be minimized, thus allowing the rider to get off the inverted vehicle safely.

Next, an operation principle of the inverted vehicle control apparatus 100 according to this exemplary embodiment is explained in detail. Firstly, the equation of motion of the inverted vehicle 110, which is the object to be controlled, can be derived as shown as Expressions (1) to (9) shown below.

$$m_w \ddot{x}_1 - H_{g1} + H_{c1} = 0 \quad [\text{Expression 1}]$$

$$m_w g - V_{g1} + V_{c1} = 0 \quad [\text{Expression 2}]$$

$$J_w \ddot{\theta}_1 + H_{g1} r_w = T_1 \quad [\text{Expression 3}]$$

$$m_w \ddot{x}_2 - H_{g2} + H_{c2} = 0 \quad [\text{Expression 4}]$$

$$m_w g - V_{g2} + V_{c2} = 0 \quad [\text{Expression 5}]$$

$$J_w \ddot{\theta}_2 + H_{g2} r_w = T_2 \quad [\text{Expression 6}]$$

$$m_c \ddot{x}_c - H_{c1} - H_{c2} = 0 \quad [\text{Expression 7}]$$

$$m_c \ddot{y}_c + m_c g - V_{c1} - V_{c2} = 0 \quad [\text{Expression 8}]$$

$$J_p \ddot{\theta}_p (V_{c1} + V_{c2}) l \sin \theta_p + (H_{c1} + H_{c2}) l \cos \theta_p = 0 \quad [\text{Expression 9}]$$

In the above-shown Expressions (1) to (9), each symbol is defined as follows. $m_w$: the mass [kg] of the first and second driving wheels 402, $x_1$: a first wheel horizontal position [m] (horizontal position of the first driving wheel 402), $x_2$: a second wheel horizontal position [m] (horizontal position of the second driving wheel 402), $H_{g1}$: a horizontal reaction force (friction reaction force) [N] exerted from the road surface to the first driving wheel 402, $H_{g2}$: a horizontal reaction force (friction reaction force) [N] exerted from the road surface to the second driving wheel 402, $H_{c1}$: a horizontal reaction force [N] exerted from the chassis 404 (integrally composed of the platform 401, handlebar 403, and rider) to the first driving wheel 402, $H_{c2}$: a horizontal reaction force [N] exerted from the chassis 404 to the second driving wheel 402, $V_{g1}$: a vertical reaction force [N] exerted from the road surface to the first driving wheel 402, $V_{g2}$: a vertical reaction force [N] exerted from the road surface to the second driving wheel 402, $V_{c1}$: a vertical reaction force [N] exerted from the chassis 404 to the first driving wheel 402, $V_{c2}$: a vertical reaction force [N] exerted from the chassis 404 to the second driving wheel 402, $J_w$: the moment of inertia [kg·m²] of the first and second driving wheels 402, $\theta_1$: a first wheel angle [rad] (rotation angle of the first driving wheel 402), $\theta_2$: a second wheel angle [rad] (rotation angle of the second driving wheel 402), $r_w$: the radius [m] of the first and second driving wheels 402, $T_1$: a first motor torque [N·m] (torque of the first motor 113), $T_2$: a second motor torque [N·m] (torque of the second motor 113), $m_c$: the mass [kg] of the chassis 404, $x_c$: a horizontal position [m] of the chassis 404, $y_c$: a vertical position [m] of the chassis 404, g: the gravitational acceleration [m/s²], $J_p$: the moment of inertia [kg·m²] of the chassis 404 around the pitch axis, $\theta_p$: a pitch angle [rad], and l: the distance [m] between the axle of the first and second driving wheels 402 and the center of gravity of the chassis 404.

The horizontal position $x_c$ and the vertical position $y_c$ of the platform 401 can be expressed as Expressions (10) and (11) shown below.

$$x_c = \frac{x_1 + x_2}{2} + l\sin\theta_p \quad \text{[Expression 10]}$$

$$y_c = l\cos\theta_p \quad \text{[Expression 11]}$$

Expression (12) shown below can be obtained based on the above-shown Expressions (1), (3), (4), (6), (7) and (10).

$$\left(m_w + \frac{m_c}{2}\right)r_w\ddot{x}_1 + \left(m_w + \frac{m_c}{2}\right)r_w\ddot{x}_2 - m_c r_w l\sin\theta_p\dot{\theta}_p^2 + \quad \text{[Expression 12]}$$
$$m_c r_w l\cos\theta p\ddot{\theta}_p + J_w\ddot{\theta}_1 + J_w\ddot{\theta}_2 = T_1 + T_2$$

A relation expressed by Expression (13) shown below holds among the first wheel horizontal position $x_1$, the second wheel horizontal position $x_2$, and the yaw angle $\theta_y$. Note that in the below-shown Expression (13), the symbol d represents the distance between the wheels (distance [m] between the first and second driving wheels 402).

$$x_1 - x_2 = d\tan\theta_y \quad \text{[Expression13]}$$

By differentiating the above-shown Expression (13) with respect to time twice, Expression (14) shown below can be obtained.

$$\ddot{x}_1 - \ddot{x}_2 = 2d\sec^2\theta_y\tan\theta_y\dot{\theta}_y^2 + d\sec^2\theta_y\ddot{\theta}_y \quad \text{[Expression 14]}$$

Based on the above-shown Expressions (12) and (14), the first wheel horizontal acceleration (horizontal acceleration of the first driving wheel) $d^2x_1/dt^2$ and the second wheel horizontal acceleration (horizontal acceleration of the second driving wheel) $d^2x_2/dt^2$ can be expressed as Expressions (15) and (16) shown below.

$$\ddot{x}_1 = \frac{m_c l}{m_w + \frac{m_c}{2}}\sin\theta_p\dot{\theta}_p^2 - \frac{m_c l}{m_w + \frac{m_c}{2}}\cos\theta_p\ddot{\theta}_p - \quad \text{[Expression 15]}$$
$$\frac{J_w}{\left(m_w + \frac{m_c}{2}\right)r_w}\ddot{\theta}_1 - \frac{J_w}{\left(m_w + \frac{m_c}{2}\right)r_w}\ddot{\theta}_2 +$$
$$\frac{1}{\left(m_w + \frac{m_c}{2}\right)r_w}T_1 + \frac{1}{\left(m_w + \frac{m_c}{2}\right)r_w}T_2 +$$
$$2d\sec^2\theta_y\tan\theta_y\dot{\theta}_y^2 + \frac{d}{\left(m_w + \frac{m_c}{2}\right)r_w}\sec^2\theta_y\ddot{\theta}_y$$

$$\ddot{x}_2 = \frac{m_c l}{m_w + \frac{m_c}{2}}\sin\theta_p\dot{\theta}_p^2 - \frac{m_c l}{m_w + \frac{m_c}{2}}\cos\theta_p\ddot{\theta}_p - \quad \text{[Expression 16]}$$
$$\frac{J_w}{\left(m_w + \frac{m_c}{2}\right)r_w}\ddot{\theta}_1 - \frac{J_w}{\left(m_w + \frac{m_c}{2}\right)r_w}\ddot{\theta}_2 +$$
$$\frac{1}{\left(m_w + \frac{m_c}{2}\right)r_w}T_1 + \frac{1}{\left(m_w + \frac{m_c}{2}\right)r_w}T_2 -$$
$$2d\sec^2\theta_y\tan\theta_y\dot{\theta}_y^2 - \frac{d}{\left(m_w + \frac{m_c}{2}\right)r_w}\sec^2\theta_y\ddot{\theta}_y$$

The wheel horizontal acceleration calculator 123 calculates the first and second horizontal accelerations by using the above-shown Expressions (15) and (16), and outputs the calculated first and second horizontal accelerations to the wheel horizontal speed calculator 125.

The skid parameter calculator 124 respectively calculates a first skid parameter $s_1$ indicating the skid state between the first driving wheel 402 and road surface and a second skid parameter $s_2$ indicating the skid state between the second driving wheel 402 and road surface by using the above-shown Expressions (17) and (18), and outputs the calculated first and second skid parameters $s_1$ and $s_2$ to the wheel angular speed reference input calculator 121.

$$S_1 = \begin{cases} 0 & x_1 = r_w\theta_1 \\ 1 & \text{otherwise} \end{cases} \quad \text{[Expression 17]}$$

Note that in the above-shown Expression (17), when the first skid parameter $s_1$ is zero (i.e., $s_1=0$), it means that the first driving wheel 402 is not skidding on the road surface. Further, when the first skid parameter $s_1$ is one (i.e., $s_1=1$), it means that the first driving wheel 402 is skidding on the road surface.

$$s_2 = \begin{cases} 0 & x_2 = r_w\theta_2 \\ 1 & \text{otherwise} \end{cases} \quad \text{[Expression 18]}$$

Similarly, in the above-shown Expression (18), when the second skid parameter $s_2$ is zero (i.e., $s_2=0$), it means that the second driving wheel 402 is not skidding on the road surface, whereas when the second skid parameter $s_2$ is one (i.e., $s_2=1$), it means that the second driving wheel 402 is skidding on the road surface.

Next, the equation of motion of the inverted vehicle 110 around the pitch axis, which is used for control design for the safety controller 122, is derived. Firstly, Expression (19) shown below can be obtained by substituting the above-shown Expressions (1), (2), (4) and (5) into the above-shown Expression (9).

$$J_p\ddot{\theta}_p + (2m_wg - V_{g1} - V_{g2})l\sin\theta_p + (m_w\ddot{x}_1 + m_w\ddot{x}_2 - H_{g1} - H_{g2})l\cos\theta_p = 0 \quad \text{[Expression 19]}$$

Further, Expression (20) shown below can be obtained by substituting the above-shown Expressions (2) and (5) into the above-shown Expression (8).

$$m_c\ddot{y}_c + 2m_wg + m_cg - V_{g1} - V_{g2} = 0 \quad \text{[Expression 20]}$$

Further, Expression (21) shown below can be obtained by using the above-shown Expressions (3), (6), (19) and (20).

$$J_p\ddot{\theta}_p + (m_c\ddot{y}_c + m_cg)l\sin\theta_p + \quad \text{[Expression 21]}$$
$$\left(m_w\ddot{x}_1 + m_w\ddot{x}_2 + \frac{J_w\ddot{\theta}_1 - T_1}{r_w} + \frac{J_w\ddot{\theta}_2 - T_2}{r_w}\right)l\cos\theta_p = 0$$

By differentiating the above-shown Expression (11) with respect to time twice, Expression (22) shown below can be obtained.

$$\ddot{y}_c = -l\cos\theta_p\dot{\theta}_p^2 - l\sin\theta_p\ddot{\theta}_p \quad \text{[Expression 22]}$$

Expression (23) shown below, which is the equation of motion of the inverted vehicle 110 around the pitch axis, can be obtained by substituting the above-shown Expression (22) into the above-shown Expression (12).

$$J_p \ddot{\theta}_p + \left(-m_c l \cos\theta_p \dot{\theta}_p^2 - m_c l \sin\theta_p \ddot{\theta}_p + m_c g\right) l \sin\theta_p + \left(m_w \ddot{x}_1 + m_w \ddot{x}_2 + \frac{J_w \ddot{\theta}_1 - T_1}{r_w} + \frac{J_w \ddot{\theta}_2 - T_2}{r_w}\right) l \cos\theta_p = 0 \quad \text{[Expression 23]}$$

The wheel angular speed reference input calculator 121 respectively calculates a first wheel angular speed reference input for the first driving wheel 402 and a second wheel angular speed reference input for the second driving wheel 402 based on the traveling direction speed information from the traveling direction speed input device 112, the wheel horizontal speed from the wheel horizontal speed calculator 125, and the first and second skid parameters from the skid parameter calculator 124, and outputs the calculated first and second wheel angular speed reference inputs to the safety controller 122.

Specifically, when the first skid parameter $s_1$ from the skid parameter calculator 124 is zero (i.e., $s_1=0$), the wheel angular speed reference input calculator 121 calculates a first wheel angular speed reference input according to the traveling direction and the moving speed of the inverted vehicle 110 provided from the traveling direction speed input device 112 and outputs the calculated first wheel angular speed reference input to the safety controller 122.

When the first skid parameter $s_1$ from the skid parameter calculator 124 is one (i.e., $s_1=1$), the wheel angular speed reference input calculator 121 calculates a first wheel angular speed reference input expressed by Expression (24) shown below and outputs the calculated first wheel angular speed reference input to the safety controller 122. Note that in the below-shown Expression (24), the symbol $\delta$ represents a small parameter [rad/s] of the wheel angular speed reference input.

Note that when the inverted vehicle 110 is moving forward in a forward-bent posture, it is possible to produce the maximum value of the friction reaction force exerted from the road surface in such a direction that the inverted vehicle 110 is raised by the friction reaction force by rotating the skidding first and second driving wheels 402 slightly faster than the traveling speed of the inverted vehicle 110. As a result, it is possible to maintain the inverted state of the inverted vehicle 110 as much as possible. Further, when the inverted vehicle 110 is moving forward in a backward-bent posture, it is possible to produce the maximum value of the friction reaction force exerted from the road surface in such a direction that the inverted vehicle 110 is raised by the friction reaction force by rotating the skidding first and second driving wheels 402 slightly slower than the traveling speed of the inverted vehicle 110. As a result, it is possible to maintain the inverted state of the inverted vehicle 110 as much as possible. The above-shown Expression (24) and the below-shown Expression (25) are defined based on the above-described idea.

$$\dot{\theta}_{1r} = \frac{\dot{x}_1}{r_w} + \delta \operatorname{sgn}(\theta_p) \quad \text{[Expression 24]}$$

Similarly, when the second skid parameter $s_2$ from the skid parameter calculator 124 is zero (i.e., $s_2=0$), the wheel angular speed reference input calculator 121 calculates a second wheel angular speed reference input according to the traveling direction and the moving speed of the inverted vehicle 110 provided from the traveling direction speed input device 112 and outputs the calculated second wheel angular speed reference input to the safety controller 122. Further, when the second skid parameter $s_2$ from the skid parameter calculator 124 is one (i.e., $s_2=1$), the wheel angular speed reference input calculator 121 calculates a second wheel angular speed reference input expressed by Expression (25) shown below and outputs the calculated second wheel angular speed reference input to the safety controller 122.

$$\dot{\theta}_{2r} = \frac{\dot{x}_2}{r_w} + \delta \operatorname{sgn}(\theta_p) \quad \text{[Expression 25]}$$

Next, a method for deriving first and second motor torques $T_1$ and $T_2$ for the actually skidding first and second driving wheels 402 is explained. In the above-shown Expression (17), when the first skid parameter $s_1$ is one (i.e., $s_1=1$), the first motor torque $T_1$ is derived in the following manner. Firstly, a variable $q_1$ is introduced in Expression (26) shown below. Note that in the below-shown Expression (26), the symbol $\lambda_1$ represents the degree of convergence [rad/s] of the first wheel angle deviation.

$$q_1 \dot{\theta}_{1r} - \dot{\theta}_1 + \lambda_1(\theta_{1r} - \theta_1) \quad \text{[Expression 26]}$$

By using the above-shown Expression (26), a candidate for a Liapunov function can be expressed by Expression (27) shown below.

$$V_1 = \frac{1}{2} J_w q_1^2 > 0, \quad \text{[Expression 27]}$$
$$\forall q_1 \neq 0$$

Further, by differentiating the above-shown Expression (27) with respect to time once, Expression (28) shown below can be obtained.

$$\dot{V}_1 = J_w q_1 \dot{q}_1 \quad \text{[Expression 28]}$$
$$= J_w q_1 \left[\ddot{\theta}_{1r} - \dot{\theta}_1 + \lambda_1(\dot{\theta}_{1r} - \dot{\theta}_1)\right]$$
$$= q_1 \left[J_w \ddot{\theta}_{1r} + H_{g1} r_w - T_1 + J_w \lambda_1(\dot{\theta}_{1r} - \dot{\theta}_1)\right]$$

In the above-shown Expression (28), a sufficient condition under which a negative fixed value is obtained for every $q_1$ ($q_1 \neq 0$) can be expressed by Expression (29) shown below. Note that in the below-shown Expression (29), the symbol $M_1$ represents the amplitude [N·m] of the first motor torque $T_1$ when the first driving wheel 402 is skidding.

$$T_1 = M_1 \operatorname{sgn}(q_1)$$

$$M_1 > |J_w \ddot{\theta}_{1r} + J_w \lambda_1(\dot{\theta}_{1r} - \dot{\theta}_1)| + |H_{g1} r_w| \quad \text{[Expression 29]}$$

By using the first motor torque $T_1$ calculated by the above-shown Expression (29), the first wheel angle $\theta_1$, which is the rotation angle of the first driving wheel 402, can be made to converge at the first wheel angle reference input $\theta_{1r}$.

When the first skid parameter $s_1$ is one (i.e., $s_1=1$), the safety controller 122 calculates the first motor torque $T_1$ based on the first wheel angular speed reference input expressed by the above-shown Expression (24) provided from the wheel angular speed reference input calculator 121 by using the above-shown Expression (29). The safety controller 122 can bring the friction between the first driving wheel 402 that has just started skidding and the road surface close to the maximum static friction by outputting a motor current corresponding to the calculated first motor torque $T_1$, and thereby prevent the skidding speed of the first driving wheel 402 from increasing.

Similarly, when the second skid parameter $s_2$ is one (i.e., $s_2=1$), the safety controller 122 calculates the second motor torque $T_2$ based on the second wheel angular speed reference input expressed by the above-shown Expression (25) provided from the wheel angular speed reference input calculator 121 by using Expression (30) shown below. Note that in the below-shown Expression (30), the symbol $\lambda_2$ represents the degree of convergence [rad/s] of the second wheel angle deviation, and the symbol $M_2$ represents the amplitude [N·m] of the second motor torque $T_2$ when the second driving wheel 402 is skidding.

$$T_2 = M_2 \operatorname{sgn}(q_2)$$

$$M_2 > |J_w \ddot{\theta}_{2r} + J_w \lambda_2 (\dot{\theta}_{2r} - \dot{\theta}_2)| + |H_{g2} r_w| \quad \text{[Expression 30]}$$

Next, a method of deriving, when one of the first and second driving wheels 402 is skidding, a motor torque for the other non-skidding first or second driving wheel 402 is explained. For example, when only the second driving wheel 402 is skidding, the above-shown Expression (23) can be rewritten into Expression (31) shown below by using the above-shown Expression (30).

$$J_p \ddot{\theta}_p + \left( -m_c l \cos\theta_p \dot{\theta}_p^2 - m_c l \sin\theta_p \ddot{\theta}_p + m_c g \right) l \sin\theta_p + \quad \text{[Expression 31]}$$
$$\left( m_w r_w \ddot{\theta}_1 + m_w \ddot{x}_2 + \frac{J_w \ddot{\theta}_1 - T_1}{r_w} + \frac{J_w \ddot{\theta}_2 - M_2 \operatorname{sgn}(q_2)}{r_w} \right)$$
$$l \cos\theta_p = 0$$

Here, a first motor torque $T_1$ for controlling the pitch angle of the platform 401 is calculated. Firstly, a variable shown in the below-shown Expression (32) and a candidate for a Liapunov function shown in the below-shown Expression (33) are introduced. In the below-shown Expression (32), the symbol $\lambda_p$ represents the degree of convergence [rad/s] of the pitch angle deviation.

$$q_p = \dot{\theta}_p + \lambda_p \theta_p \quad \text{[Expression 32]}$$

$$V_p = \frac{1}{2} J_p q_p^2 > 0, \quad \text{[Expression 33]}$$
$$\forall q_p \neq 0$$

By differentiating the above-shown Expression (33) with respect to time once, Expression (34) shown below can be obtained.

$$\dot{V}_p = 2 J_p q_p \dot{q}_p \quad \text{[Expression 34]}$$
$$= -2 J_p q_p \big[ \left( -m_c l \cos\theta_p \dot{\theta}_p^2 - m_c l \sin\theta_p \ddot{\theta}_p + m_c g \right) l \sin\theta_p +$$
$$\left( m_w r_w \ddot{\theta}_1 + m_w \ddot{x}_2 + \frac{J_w \ddot{\theta}_1 - T_1}{r_w} + \frac{J_w \ddot{\theta}_2 - M_2 \operatorname{sgn}(q_2)}{r_w} \right)$$
$$l \cos\theta_p \big]$$

In the above-shown Expression (34), a sufficient condition under which a negative fixed value is obtained for every $q_p$ ($q_p \neq 0$) can be obtained as Expression (35) shown below by using the above-shown Expression (14). Note that in the below-shown Expression (35), the symbol Mp1 represents the amplitude [N·m] of the first motor torque $T_1$ when the first driving wheel 402 is not skidding.

$$T_1 = -M_{p1} \operatorname{sgn}(q_p) M_{p1} > \quad \text{[Expression 35]}$$
$$\left| -r_w m_c l \cos\theta_p \dot{\theta}_p^2 - r_w m_c l \sin\theta_p \ddot{\theta}_p + r_w m_c g \right| +$$
$$\left| 2 m_w r_w^2 \ddot{\theta}_1 - 2 d \sec^2 \theta_y \tan\theta_y \dot{\theta}_y^2 - \right.$$
$$\left. d \sec^2 \theta_y \ddot{\theta}_y + J_w \ddot{\theta}_1 + J_w \ddot{\theta}_2 - M_2 \operatorname{sgn}(q_2) \right|$$

Further, in the above-shown Expression (35), a condition expressed by Expression (36) shown below is assumed.

$$\theta_p \in \left[ -\frac{\pi}{4}, \frac{\pi}{4} \right] \quad \text{[Expression 36]}$$

In general, when the pitch angle $\theta_p$ of the platform 401 exceeds the range expressed by the above-shown Expression (36), it is very difficult for the rider to continue to be on the inverted vehicle 110 and thus the rider eventually gets off the inverted vehicle 110. As a result, the inversion control is no longer necessary. Therefore, the inverted vehicle control apparatus 100 according to this exemplary embodiment stops the inversion control (safe torque-off).

When only the second driving wheel 402 is skidding (when the first skid parameter $s_1$ is zero ($s_1=0$) and the second skid parameter $s_2$ is one ($s_2=1$)), the safety controller 122 controls the first motor 113 based on the first motor torque $T_1$ expressed by the above-shown Expression (35). As a result, it is possible to maintain the inverted state of the inverted vehicle 110 while making the pitch angle $\theta_p$ of the platform 401 converge at zero.

On the other hand, when only the first driving wheel 402 is skidding (when the first skid parameter $s_1$ is one ($s_1=1$) and the second skid parameter $s_2$ is zero ($s_2=0$)), the safety controller 122 controls the second motor 113 based on the second motor torque $T_2$ expressed by Expression (37) shown below. As a result, it is possible to maintain the inverted state of the inverted vehicle 110. Note that in the below-shown Expression (37), the symbol Mp2 represents the amplitude [N·m] of the second motor torque $T_2$ when the second driving wheel 402 is not skidding.

$$T_2 = -M_{p2} \operatorname{sgn}(q_p) M_{p2} > \quad \text{[Expression 37]}$$
$$\left| -r_w m_c l \cos\theta_p \dot{\theta}_p^2 - r_w m_c l \sin\theta_p \ddot{\theta}_p + r_w m_c g \right| +$$
$$\left| 2 m_w r_w^2 \ddot{\theta}_1 - 2 d \sec^2 \theta_y \tan\theta_y \dot{\theta}_y^2 - \right.$$
$$\left. d \sec^2 \theta_y \ddot{\theta}_y + J_w \ddot{\theta}_1 + J_w \ddot{\theta}_2 - M_1 \operatorname{sgn}(q_1) \right|$$

Note that although the above-described equation of motion does not include any term for disturbance, it is possible to suppress disturbance by setting the amplitudes of the first and second motor torques $T_1$ and $T_2$ to sufficiently large values to allow the maximum value of the absolute value of the disturbance.

Next, a simulation result of the inverted vehicle control apparatus 100 according to this exemplary embodiment is explained in detail. Firstly, each parameter is set as shown below in this simulation. Note that the symbol $n_g$ represents a reduction ratio and the symbol T represents a control cycle.

$m_c$=70 [kg], $J_p$=25.2 [kg·m²], $m_w$=15 [kg], $J_w$=0.075 [kg·m²], $l$=0.9 [m], $r_w$=0.1 [m], $d$=0.3 [m], $g$=9.8 [m/s²], $n_g$=100, $\lambda_p$=10·2π[rad/s], $T$=1×10⁻³[s]

Figure 2:
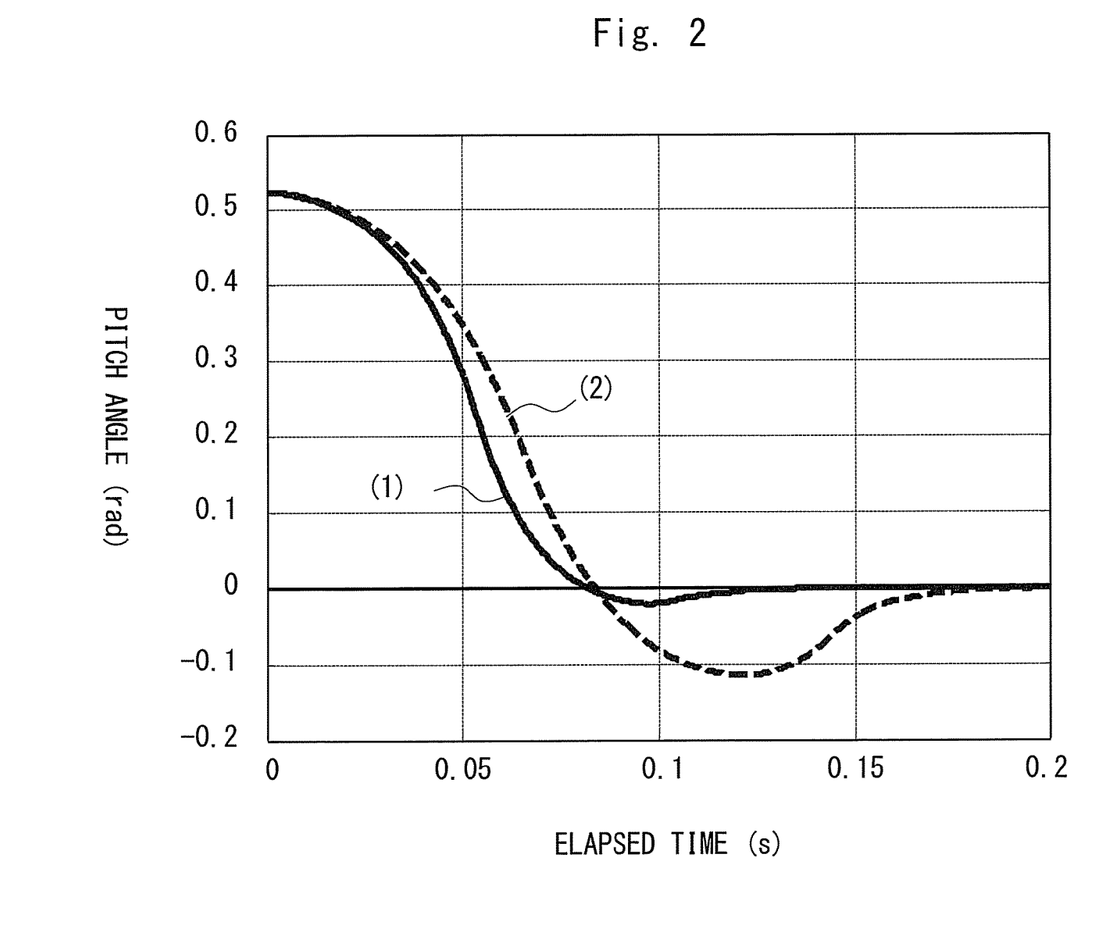
FIG. 2 is a graph showing a simulation result of an inverted vehicle control apparatus according to an exemplary embodiment of the present invention, and shows temporal changes of the pitch angle of a platform.

This simulation is carried out on the assumption that, for example, only the second driving wheel 402 moves on a road surface having low friction such as a frozen puddle when the inverted vehicle 110 is traveling. FIG. 2 is a graph showing a simulation result of the inverted vehicle control apparatus 100 according to this exemplary embodiment, and shows temporal changes of the pitch angle of the platform. In FIG. 2, the solid line (1) represents pitch angles $\theta_p$ obtained by the inverted vehicle control apparatus 100 according to this exemplary embodiment, and the broken line (2) represents pitch angles obtained by an inverted vehicle control apparatus in related art. In this example, the related-art inverted vehicle control apparatus performs a sliding mode control that is designed under the assumption that both the first and second driving wheels are not skidding.

In FIG. 2, at a time 0[s], the second driving wheel 402 moves on a low-friction road surface and the first driving wheel 402 moves on a road surface having a kinetic-friction coefficient of 0.9. Further, it is assumed that the actual value of the moment of inertia Jp of the chassis 404 around the pitch angle is larger than the assumed value used in the control design in the above-shown Expression (35) by about 20[%]. Further, it is assumed that there is an inverted saw-tooth disturbance having a peak value of 4×10³[N·m] and a cycle of 10 T[s] for the first driving wheel 402 due to the unevenness of the road surface.

As can be seen from FIG. 2, in the related-art inverted vehicle control apparatus, the rider inclines backward at a pitch angle of 0.1 [rad] or larger when the rider tries to maintain the inverted state of the inverted vehicle. Further, in this simulation, since the rider and the chassis are modeled as one integrated rigid body, the inverted state can be maintained at a time 0.2 [s]. However, there is a possibility that a real rider will react to the backward inclination of the inverted vehicle and, after that, fall down backward when the rider inclines the inverted vehicle forward.

In contrast to this, it can be seen that in the inverted vehicle control apparatus 100 according to this exemplary embodiment, the inverted vehicle hardly inclines backward and thus the inverted state of the inverted vehicle 110 can be safely maintained.

Figure 3:
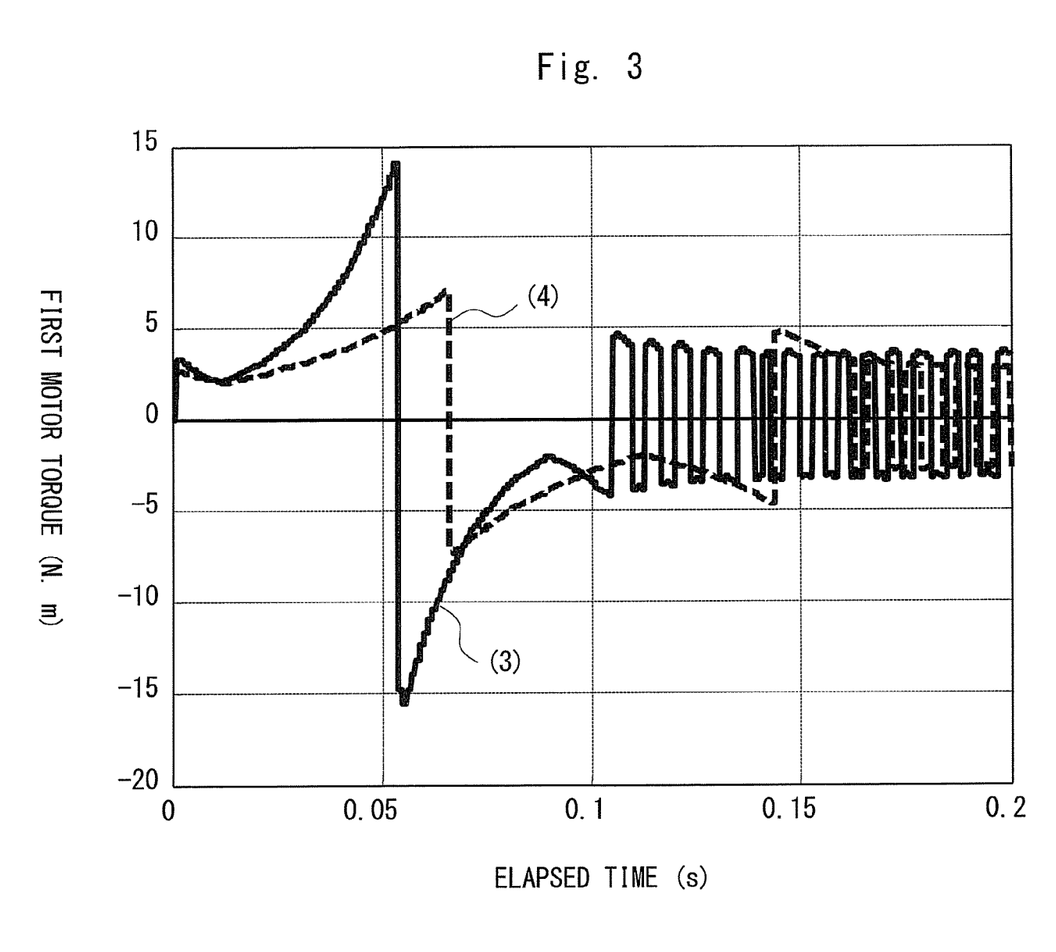
FIG. 3 is a graph showing a simulation result of an inverted vehicle control apparatus according to an exemplary embodiment of the present invention, and shows temporal changes of a first motor torque.

FIG. 3 is a graph showing a simulation result of the inverted vehicle control apparatus according to this exemplary embodiment, and shows temporal changes of the first motor torque. In FIG. 2, the solid line (3) represents first motor torques obtained by the inverted vehicle control apparatus 100 according to this exemplary embodiment, and the broken line (4) represents first motor torques obtained by the related-art inverted vehicle control apparatus.

In the related-art inverted vehicle control apparatus, the sign of its first motor torque changes at an interval of 0.7[s] or larger. In contrast to this, in the inverted vehicle control apparatus 100 according to this exemplary embodiment, the sign of its first motor torque $T_1$ changes at small intervals at and after a time 0.1[s]. This means that the phase trajectory of the inverted vehicle control apparatus 100 according to this exemplary embodiment converges on the switching plane faster than the phase trajectory of the related-art inverted vehicle control apparatus. That is, this means that the inverted vehicle control apparatus 100 according to this exemplary embodiment has a higher ability for stabilizing the posture of the inverted vehicle 110 than that of the related-art inverted vehicle control apparatus.

As can be seen from the above-shown simulation results, when one of the first and second driving wheels 402 of the inverted vehicle 110 is skidding on the road surface, the inverted state can be maintained by using the non-skidding driving wheel 402 alone without widely inclining the inverted vehicle 110 backward. Therefore, it is possible to safely control the inverted vehicle 110 without feeling any anxiety.

As explained above, the inverted vehicle control apparatus 100 according to this exemplary embodiment controls, based on operation information entered by the rider, the first or second driving wheel 402 for which no skid is detected, and controls the first or second driving wheel 402 for which a skid is detected so that the friction reaction force exerted from the road surface to the first or second driving wheel 402 is exerted in such a direction that the inverted vehicle 110 is raised by the friction reaction force. In this manner, by appropriately controlling not only the non-skidding driving wheel 402 but also the skidding driving wheel 402, the inverted state of the inverted vehicle 110 can be maintained as much as possible. Further, even if the inverted state cannot be maintained, the falling-down impact can be minimized, thus allowing the rider to get off the inverted vehicle safely. That is, it is possible to make the inverted vehicle 110 travel safely or stop safely even on a low-friction road surface.

Note that the present invention is not limited to the above-described exemplary embodiments, and those exemplary embodiments can be modified as appropriate without departing from the spirit and scope of the present invention. For example, although the present invention is applied to the inverted vehicle 110 including a pair of first and second driving wheels 402 in the above-described exemplary embodiment, the present invention is not limited to such inverted vehicles. That is, the present invention can be applied to an inverted vehicle including three or more driving wheels or an inverted vehicle including a coupled driving wheel(s).

Further, although an example in which a disturbance such as changes in the rider's weight and effects of unevenness of the road surface is taken into consideration is explained in the above-described exemplary embodiment, the present invention is not limited to such examples. For example, the present invention can be applied to a case where there is an arbitrary disturbance such as when a head wind is blowing and when the inverted vehicle comes into contact with a nearby person, an object, or the like.

Further, although the present invention is explained on the assumption it is implemented by a hardware configuration in the above-described exemplary embodiment, the present invention is not limited to such hardware configurations. In the present invention, the above-described processes performed by the control device 120 can be implemented by causing a CPU to execute a computer program.

The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to computers by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or wireless communication path.

INDUSTRIAL APPLICABILITY

The present invention can be applied to an inverted vehicle control apparatus that can make an inverted vehicle travel safely even on a low-friction road surface by controlling a plurality of driving wheels.

REFERENCE SIGNS LIST

100 INVERTED VEHICLE CONTROL APPARATUS
110 INVERTED VEHICLE
111 CONTROL MECHANISM
112 TRAVELING DIRECTION SPEED INPUT DEVICE
113 FIRST MOTOR, SECOND MOTOR
114 WHEEL ANGULAR SPEED DETECTOR
115 PITCH ANGLE DETECTOR
116 YAW ANGLE DETECTOR
120 CONTROL DEVICE
121 WHEEL ANGULAR SPEED REFERENCE INPUT CALCULATOR
122 SAFETY CONTROLLER
123 WHEEL HORIZONTAL ACCELERATION CALCULATOR
124 SKID PARAMETER CALCULATOR
125 WHEEL HORIZONTAL SPEED CALCULATOR
401 PLATFORM
402 FIRST DRIVING WHEEL, SECOND DRIVING WHEEL
403 HANDLEBAR
404 CHASSIS

The invention claimed is:

1. An inverted vehicle control apparatus comprising:
first and second driving wheels provided in an inverted vehicle;
first and second drive means for driving the first and second driving wheels respectively;
skid detection means for detecting a skid state between the first and second driving wheels and a road surface;
operation information acquisition means for acquiring operation information of a rider relating a traveling direction and a traveling speed of the inverted vehicle; and
control means for controlling driving of the first and second drive means and thereby controlling the first and second driving wheels, wherein
the inverted vehicle control apparatus further comprises:
pitch angle detection means for detecting a pitch angle of the inverted vehicle; and
wheel horizontal speed calculation means for calculating a horizontal speed of the first and second driving wheels of the inverted vehicle,
the control means controls, based on the operation information acquired by the operation information acquisition means, to maintain the inverted state according to the operation information, the first or second driving wheel for which no skid is detected by the skid detection means, and
the control means controls, based on the pitch angle of the inverted vehicle detected by the pitch angle detection means and the horizontal speed of the first or second driving wheel calculated by the wheel horizontal speed calculation means, so that the friction force exerted from the road surface to the first or second driving wheel is exerted in such a direction that the inverted vehicle is raised by the friction force, the first and second driving wheel for which a skid is detected by the skid detection means,
wherein the control means comprises:
wheel angular speed reference input calculation means for calculating an angular speed reference input of the first and second driving wheels based on operation information acquired by the operation information acquisition means, a horizontal moving speed of the first and second driving wheels calculated by the wheel horizontal speed calculation means, and skid information of the first and second driving wheels detected by the skid detection means; and
safety control means for maintaining an inverted state of the inverted vehicle by controlling the driving of the first and second drive means based on the angular speed reference input of the first and second driving wheels calculated by the wheel angular speed reference input calculation means, and
wherein the wheel angular speed reference input calculation means calculates the angular speed reference input for the first and second driving wheels for which the skid is detected by the skid detection means, by using an expression shown below, $$\dot{\theta}_r = \frac{\dot{x}}{r_w} + \delta \mathrm{sgn}(\theta_p) \qquad \text{[Expression 1]}$$

where: $r_w$ is a radius of the driving wheel; a derivative value of x is a horizontal speed of the first and second driving wheels calculated by the wheel horizontal speed calculation means; $\theta_p$ is a pitch angle of the inverted vehicle detected by the pitch angle detection means; a derivative value of $\theta_r$ is an angular speed reference input of the first and second driving wheels; and $\delta$ is a small parameter of the angular speed reference input.

2. The inverted vehicle control apparatus according to claim 1, wherein the operation information acquisition means comprises traveling direction speed input means for outputting a traveling direction and a traveling speed of the inverted vehicle based on the operation information entered by the rider.

3. The inverted vehicle control apparatus according to claim 1, further comprising:
wheel angular speed detection means for detecting an angular speed of the first and second driving wheels;
yaw angle detection means for detecting a yaw angle of the inverted vehicle; and
wheel horizontal acceleration calculation means for calculating a horizontal acceleration of the first and second driving wheels based on the angular speed of the first and second driving wheels detected by the wheel angular speed detection means, the pitch angle of the inverted vehicle detected by the pitch angle detection means, the yaw angle of the inverted vehicle detected by the yaw angle detection means, and a control signal for controlling the first and second drive means.

4. The inverted vehicle control apparatus according to claim 3, wherein the skid detection means comprises skid parameter calculation means for calculating a skid parameter indicating whether the first and second driving wheels are skidding or not, based on the angular speed of the first and second driving wheels detected by the wheel angular speed detection means and the horizontal acceleration of the first and second driving wheels calculated by the wheel horizontal acceleration calculation means, and outputting the calculated skid parameter to the control means.

5. The inverted vehicle control apparatus according to claim 3, wherein the wheel horizontal acceleration calculation means calculates a horizontal acceleration of the first and second driving wheels by using an expression shown below, $$\ddot{x}_1 = \frac{m_c l}{m_w + \frac{m_c}{2}}\sin\theta_p \dot{\theta}_p^2 - \frac{m_c l}{m_w + \frac{m_c}{2}}\cos\theta_p \ddot{\theta}_p - \qquad \text{[Expression 2]}$$
$$\frac{J_w}{\left(m_w + \frac{m_c}{2}\right)r_w}\ddot{\theta}_1 - \frac{J_w}{\left(m_w + \frac{m_c}{2}\right)r_w}\ddot{\theta}_2 +$$
$$\frac{1}{\left(m_w + \frac{m_c}{2}\right)r_w}T_1 + \frac{1}{\left(m_w + \frac{m_c}{2}\right)r_w}T_2 +$$
$$2d\sec^2\theta_y \tan\theta_y \dot{\theta}_y^2 + \frac{d}{\left(m_w + \frac{m_c}{2}\right)r_w}\sec^2\theta_y \ddot{\theta}_y$$

$$\ddot{x}_2 = \frac{m_c l}{m_w + \frac{m_c}{2}}\sin\theta_p \dot{\theta}_p^2 - \frac{m_c l}{m_w + \frac{m_c}{2}}\cos\theta_p \ddot{\theta}_p - \qquad \text{[Expression 3]}$$
$$\frac{J_w}{\left(m_w + \frac{m_c}{2}\right)r_w}\ddot{\theta}_1 - \frac{J_w}{\left(m_w + \frac{m_c}{2}\right)r_w}\ddot{\theta}_2 +$$
$$\frac{1}{\left(m_w + \frac{m_c}{2}\right)r_w}T_1 + \frac{1}{\left(m_w + \frac{m_c}{2}\right)r_w}T_2 -$$
$$2d\sec^2\theta_y \tan\theta_y \dot{\theta}_y^2 - \frac{d}{\left(m_w + \frac{m_c}{2}\right)r_w}\sec^2\theta_y \ddot{\theta}_y$$

where: $m_w$ is a mass of the first and second driving wheels; $J_w$ is a moment of inertia of the first and second driving wheels; $x_1$ is a horizontal position of the first driving wheel; $x_2$ is a horizontal position of the second driving wheel; $\theta_1$ is an angle of the first driving wheel; $\theta_2$ is an angle of the second driving wheel; $r_w$ is a radius of the first and second driving wheels; $T_1$ is a driving torque of the first drive means; $T_2$ is a driving torque of the second drive means; $m_c$ is a mass of a chassis of the inverted vehicle; $\theta_p$ is a pitch angle of the inverted vehicle; $\theta_y$ is a yaw angle of the inverted vehicle; l is a distance between an axle of the inverted vehicle and a center of gravity of the chassis; and d is a distance between the driving wheels.

6. The inverted vehicle control apparatus according to claim 1, wherein the safety control means calculates a driving torque T for the skidding driving wheel by using an expression shown below, $$T = M\,\text{sgn}(q)$$

$$M > |J_w \ddot{\theta}_r + J_w \lambda(\dot{\theta}_r - \dot{\theta})| + |H_g r_w|$$

$$q = \dot{\theta}_r - \dot{\theta} + \lambda(\theta_r - \theta) \qquad \text{[Expression 4]}$$

where: $\lambda$ is a degree of convergence of an angle deviation of the driving wheel; M is a driving torque of the first and second driving means when the first or second driving wheel is skidding; $J_w$ is a moment of inertia of the first and second driving wheels; $r_w$ is a radius of the first and second driving wheels; $\theta_r$ is an angular speed reference input from the wheel angular speed reference input cal- culation means; $\theta$ is a wheel angle; and $H_g$ is a horizontal reaction force exerted from the road surface to the first and second driving wheels.

7. A control method for an inverted vehicle control apparatus, comprising:
a step of detecting a skid state between first and second driving wheels provided in an inverted vehicle and a road surface;
a step of detecting a pitch angle of the inverted vehicle;
a step of calculating a horizontal speed of the first and second driving wheels of the inverted vehicle; and
a step of controlling, based on the acquired operation information relating a traveling direction and a traveling speed of the inverted vehicle, to maintain the inverted state according to the operation information, the first or second driving wheel for which no skid is detected, and controlling, based on the detected pitch angle of the inverted vehicle and the calculated horizontal speed of the first or second driving wheel, so that the friction force exerted from the road surface to the first or second driving wheel is exerted in such a direction that the inverted vehicle is raised by the friction force, the first or second driving wheel for which a skid is detected wherein the step of controlling comprises:
calculating an angular speed reference input of the first and second driving wheels based on operation information of the rider which relates to a traveling direction and a traveling speed of the inverted vehicle, a horizontal moving speed of the first and second driving wheels, and skid information of the first and second driving wheels;
maintaining an inverted state of the inverted vehicle by controlling the driving of the first and second drive means based on the angular speed reference input of the first and second driving wheels, and
calculates the angular speed reference input for the first and second driving wheels for which the skid is detected, by using an expression shown below, $$\dot{\theta}_r = \frac{\dot{x}}{r_w} + \delta\,\text{sgn}(\theta_p) \qquad \text{[Expression 1]}$$

where: $r_w$ is a radius of the driving wheel; a derivative value of x is a horizontal speed of the first and second driving wheels; $\theta_p$ is a pitch angle of the inverted vehicle; a derivative value of $\theta_r$ is an angular speed reference input of the first and second driving wheels; and $\delta$ is a small parameter of the angular speed reference input.

8. A program stored on a non-transitory computer-readable medium for an inverted vehicle control apparatus, for causing a computer to execute:
a process of detecting a skid state between first and second driving wheels provided in an inverted vehicle and a road surface;
a process of calculating a horizontal speed of the first and second driving wheels of the inverted vehicle; and
a process of controlling, based on operation information of a rider, to maintain the inverted state according to the operation information, the first or second driving wheel for which no skid is detected, and controlling, based on a detected pitch angle of the inverted vehicle and the calculated horizontal speed of the first or second driving wheel, the first or second driving wheel for which a skid is detected wherein the step of controlling comprises:
calculating an angular speed reference input of the first and second driving wheels based on operation information of the rider which relates to a traveling direction and a traveling speed of the inverted vehicle, a horizontal moving speed of the first and second driving wheels, and skid information of the first and second driving wheels;

maintaining an inverted state of the inverted vehicle by controlling the driving of the first and second drive means based on the angular speed reference input of the first and second driving wheels, and calculates the angular speed reference input for the first and second driving wheels for which the skid is detected, by using an expression shown below, $$\dot{\theta}_r = \frac{\dot{x}}{r_w} + \delta \mathrm{sgn}(\theta_p) \quad \text{[Expression 1]}$$

where: $r_w$ is a radius of the driving wheel; a derivative value of x is a horizontal seed of the first and second driving wheels; $\theta_p$ is a pitch angle of the inverted vehicle; a derivative value of $\theta_r$ is an angular speed reference input of the first and second driving wheels; and $\delta$ is a small parameter of the angular speed reference input.

9. An inverted vehicle control apparatus comprising:

first and second driving wheels provided in an inverted vehicle;

first and second drive units for driving the first and second driving wheels respectively;

skid detection unit for detecting a skid state between the first and second driving wheels and a road surface;

operation information acquisition unit for acquiring operation information of a rider relating a traveling direction and a traveling speed of the inverted vehicle; and control unit for controlling driving of the first and second drive units and thereby controlling the first and second driving wheels, wherein the inverted vehicle control apparatus further comprises:

pitch angle detection unit for detecting a pitch angle of the inverted vehicle; and wheel horizontal speed calculation unit for calculating a horizontal speed of the first and second driving wheels of the inverted vehicle, the control unit controls, based on the operation information acquired by the operation information acquisition unit, to maintain the inverted state according to the operation information, the first and second driving wheels for which no skid is detected by the skid detection unit, and the control unit controls, based on the pitch angle of the inverted vehicle detected by the pitch angle detection unit and the horizontal speed of the first or second driving wheel calculated by the wheel horizontal speed calculation unit, the first or second driving wheel for which a skid is detected by the skid detection unit wherein the control unit comprises:

a wheel angular speed reference input calculation unit to calculate an angular speed reference input of the first and second driving wheels based on operation information acquired by the operation information acquisition unit, a horizontal moving speed of the first and second driving wheels calculated by the wheel horizontal speed calculation unit, and skid information of the first and second driving wheels detected by the skid detection unit; and a safety control unit to maintain an inverted state of the inverted vehicle by controlling the driving of the first and second drive wheels based on the angular speed reference input of the first and second driving wheels calculated by the wheel angular speed reference input calculation unit, and wherein the wheel angular speed reference input calculation unit calculates the angular speed reference input for the first and second driving wheels for which the skid is detected by the skid detection unit, by using an expression shown below, $$\dot{\theta}_r = \frac{\dot{x}}{r_w} + \delta \mathrm{sgn}(\theta_p) \quad \text{[Expression 1]}$$

where: $r_w$ is a radius of the driving wheel; a derivative value of x is a horizontal speed of the first and second driving wheels calculated by the wheel horizontal speed calculation unit; $\theta_p$ is a pitch angle of the inverted vehicle detected by the pitch angle detection unit; a derivative value of $\theta_r$ is an angular speed reference input of the first and second driving wheels; and $\delta$ is a small parameter of the angular speed reference input.

* * * * *